UNITED STATES PATENT OFFICE 2,059,980

MANUFACTURE OF YEAST

William Gordon Bennett, Epsom, England, assignor to Standard Brands Incorporated, New York, N. Y.

No Drawing. Application February 2, 1935, Serial No. 4,652. In Great Britain June 10, 1932

13 Claims. (Cl. 99—96)

The invention relates to the manufacture of yeast and to the new and improved products obtained thereby. More particularly, it relates to a yeast having an increased ergosterol content and a procedure for its production, and includes correlated improvements and discoveries whereby the ergosterol content of yeast is enhanced.

An object of the invention is to provide a yeast containing an amount of ergosterol that is several fold the amount present in ordinary or normal yeast.

A further object of the invention is to provide a process for the manufacture of yeast whereby the food and medicinal values thereof are augmented.

An additional object of the invention is to provide a process for the manufacture of yeast in which the nitrogen nutriment is decreased and the temperature increased with respect to the factors usually pertaining.

Another object of the invention is to provide a process for the manufacture of yeast having an enhanced sterol content which may be readily, effectively and economically produced commercially.

A specific object of the invention is to provide a process for propagating yeast in a medium deficient in nitrogen and containing a non-toxic oxidizing agent.

Other objects of the invention will in part be obvious and will in part appear hereinafter.

The invention accordingly comprises the several steps and relation of one or more of such steps with respect to each of the others and to the yeast and similar micro-organisms possessing the features, properties and qualities which are exemplified in the following detailed disclosure and the scope of the invention will be indicated in the claims.

The invention more especially relates to the manufacture of yeast with particular reference to the manufacture of such organism for use as food for human beings and animals and for medicinal purposes. It is known that S. Cerevisiae and other allied yeasts contain small amounts of ergosterol which is the parent substance of vitamin D and it has been suggested that the ergosterol content of yeast can be increased by incubating the yeast without growth in an aerated medium containing carbohydrates and phosphates.

According to the present invention the ergosterol content of yeasts is increased by cultivating them under such conditions that during the whole or a part of the complete period of treatment they are subjected in the presence of an oxidizing agent or oxygen catalyst or carrier to deficiency in nitrogenous nutrient while the other nutrient substances are supplied in normal amount.

It is preferable that the cultivation should be carried out at temperatures somewhat higher than those which are considered suitable for yeast propagation, for example, at temperatures ranging from 86-100° Fahrenheit.

The condition of nitrogenous deficiency may be brought about, for example, by adding the whole of the nitrogenous salts in the early stages of the fermentation, such total amount being however less than would normally be added for yeast growth. Alternatively the yeast may be fed throughout the whole or part of the period of its growth with a nutritive medium in which the amount of nitrogen present is insufficient for the normal requirements of the yeast. The amount of nitrogen added is governed by the character and type of yeast which is being manufactured. Thus the nitrogen additions may be up to 4.0% of the quantity of sugar in the propagating medium. A deficiency of nitrogen, accordingly, may be attained as above stated.

I have found that in spite of there being a deficiency of nitrogenous nutrient the yield of yeast produced has remained unaltered and the yeast produced is considerably richer in ergosterol than a similar yeast grown under normal conditions of yeast propagation. As a further alternative yeast that has been prepared under normal conditions can be taken and further treated under propagating conditions excepting that no further addition of assimilable nitrogen is made.

The propagation must take place under such conditions that a supply of oxygen is readily available to the yeast and therefore in addition to the aerating air, which serves both as oxidizer and agitator, I resort to the addition of a non-toxic oxidizing agent and otherwise designated as a non-toxic oxygen carrier or catalyst which may be, for example, a compound belonging to the group consisting of persulfates, percarbonates, peracetates, perphosphates, hydroquinone, Indigo carmine, methylene blue; and peroxides as those of sodium, potassium and calcium. Further, the hydroquinone, Indigo carmine and methylene blue are exemplifications of the organic compounds suitable for utilization and which are characterized by being in equilibrium with their hydrogenated derivatives, having an oxygen potential less than that of atmospheric oxygen or oxygen dissolved in an aqueous medium, and greater than that of yeast. The ergosterol content can also be further increased by exposing the yeast after growth to the action of air or oxygen.

The process is applicable to the growth of S. Cerevisiae or any other yeast capable of producing ergosterol, for example, S. Carlsbergensis.

The following examples illustrate the manner in which the invention can be carried into effect:

*Example 1*

To 400 grams of diluted molasses were added 20 per cent of seed yeast and propagation was started and continued for 9 hours under normal conditions of dilution, aeration, acidity and addition of nutrient salts with the following exceptions:

(a) The temperature was higher than normal, namely, about 92° Fahrenheit;

(b) 2 milligrams of methylene blue were added as oxygen carrier to assist the aeration, and (c) After taking into account the assimilable nitrogen already present in the molasses, standard nitrogen additions were made during only the first half of the total period of propagation so that during the second half period there was a marked deficiency of nitrogen.

When the total assimilable nitrogen used amounted to 2.4 grams (to the 400 grams of molasses) the eventual yield of yeast of high ergosterol content was 58%. In a repetition of the treatment but using 6.6 grams of nitrogen the yield was 88%. The best results are obtained by the presence of about 1.5% total nitrogen calculated on the molasses taken, i. e., this amount including the assimilable nitrogen already present in the molasses as well as the added nitrogen. The yeast obtained had a content of 0.91% ergosterol calculated on the dry mass of the yeast. When exposed to air the ergosterol content was increased to 1.19%, as compared with a content of about 0.4% in yeast as ordinarily manufactured.

*Example 2*

391 grams of yeast as ordinarily manufactured and containing 0.4% ergosterol (calculated on the dry mass of yeast) was suspended in 4000 ccs. of water to which was added 100 grams of sucrose, 40 grams of potassium hydrogen phosphate ($KH_2PO_4$), 12 grams of magnesium sulphate ($MgSO_4\cdot 7H_2O$) and 10 of sodium persulphate ($Na_2S_2O_8$), the latter acting as an oxidizing catalyst. The mass was strongly aerated for six hours, the temperature meanwhile being maintained at 92° Fahrenheit. The yeast increased in weight to 457 grams and the ergosterol content had increased to 1.08 per cent. It is to be observed that in this case the added salts contained no nitrogen. Only the nitrogen already contained in the initial yeast was available, and this was sufficient to induce the further growth which therefore took place in circumstances of nitrogen deficiency as required in accordance with the invention.

The foregoing procedure enables one to manufacture a yeast having enhanced values as a foodstuff for man and animal, and as medicinal agents. This is particularly typified by an increased ergosterol content which amounts to 2½ times that present in normal yeast. It will be realized that the invention in its broader aspects is not limited to the specific conditions as to quantities, times, temperatures and ingredients presented in the preceding examples. Thus, and more especially, potassium and lithium persulfates may be used in place of the sodium persulfate in Example 2, also in place thereof utilization may be made of a percarbonate, a peracetate and a perphosphate, and a peroxide as of sodium, potassium and calcium, in appropriate quantities. Also, it will be understood that the non-toxic oxidizing agents may be used per se or in compatible admixtures. Furthermore, in Example 1, the methylene blue may be replaced by a suitable quantity of hydroquinone or Indigo carmine, or like organic compounds.

This application is in part a continuation of my copending application Serial No. 674,825, filed June 8, 1933.

Since certain changes in carrying out the above process and certain modifications in the products which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In the manufacture of yeast, the improvement which comprises increasing the ergosterol content by cultivation of the yeast in the presence of a non-toxic oxidizing agent in an aerated nutritive medium deficient in assimilable nitrogen.

2. In the manufacture of yeast, the improvement which comprises increasing the ergosterol content by cultivation of yeast in the presence of a non-toxic oxidizing agent belonging to the group consisting of persulfates, percarbonates, peracetates, perphosphates, hydroquinone, Indigo carmine, methylene blue, and the peroxides of sodium, potassium and calcium in an aerated nutritive medium deficient in assimilable nitrogen.

3. In the manufacture of yeast, the improvement which comprises increasing the ergosterol content by cultivation of the yeast in the presence of sodium persulfate in an aerated nutritive medium deficient in assimilable nitrogen.

4. In the manufacture of yeast, the improvement which comprises increasing the ergosterol content by cultivation of the yeast in the presence of methylene blue in an aerated nutritive medium deficient in assimilable nitrogen.

5. In the manufacture of yeast, the improvement which comprises increasing the ergosterol content by cultivation of the yeast in the presence of a non-toxic oxidizing agent in an aerated nutritive medium deficient in assimilable nitrogen at a temperature of about 86° to 100° F.

6. In the manufacture of yeast, the improvement which comprises increasing the ergosterol content by cultivation of yeast in the presence of a non-toxic oxidizing agent belonging to the group consisting of persulfates, percarbonates, peracetates, perphosphates, hydroquinone, Indigo carmine, methylene blue, and the peroxides of sodium, potassium and calcium in an aerated nutritive medium deficient in assimilable nitrogen at a temperature of about 86° to 100° F.

7. In the manufacture of yeast, the improvement which comprises increasing the ergosterol content by cultivation of the yeast in the presence of sodium persulfate in an aerated nutritive medium deficient in assimilable nitrogen at a temperature of about 86° to 100° F.

8. In the manufacture of yeast, the improvement which comprises increasing the ergosterol content by cultivation of the yeast in the presence of methylene blue in an aerated nutritive medium deficient in assimilable nitrogen at a temperature of about 86° to 100° F.

9. A process for the production of yeast of high ergosterol content which comprises propagating the yeast in a seeded mash by the usual aeration method subject to the following variations: (a) a propagating temperature of about 86° to 100° Fahrenheit, (b) addition of a non-toxic oxidizing agent belonging to the group consisting of persulfates, percarbonates, peracetates, perphosphates, hydroquinone, Indigo carmine, methylene blue and the peroxides of sodium, potassium and calcium additional to the aerating air, and (c) addition of a standard amount of nitrogenous nutrient during only the early stages of fermentation, whereby the total assimilable nitrogen is sub-normal.

10. A process for the production of yeast of high ergosterol content which comprises propagating the yeast in a seeded mash by the usual aeration method subject to the following variations: (a) a propagating temperature of about 86° to 100° Fahrenheit, (b) addition of a non-toxic oxidizing agent belonging to the group consisting of persulfates, percarbonates, peracetates, perphosphates, hydroquinone, Indigo carmine, methylene blue and the peroxides of sodium, potassium and calcium additional to the aerating air, and (c) addition of a constant but sub-normal amount of nitrogenous nutrient throughout the fermentation period, whereby the total assimilable nitrogen is sub-normal.

11. In a process for the production of yeast of high ergosterol content, the improvement which comprises subjecting yeast as the starting material to a further aeration treatment at a temperature between 86° to 100° F., in the presence of a non-toxic oxidizing agent and customary nutrient salts with the exception of assimilable nitrogen containing material.

12. In a process for the production of yeast of high ergosterol content, the improvement which comprises subjecting yeast as the starting material to a further aeration treatment at a temperature between 86° and 100° F., in the presence of a non-toxic oxidizing agent belonging to the group consisting of persulfates, percarbonates, peracetates, perphosphates, hydroquinone, Indigo carmine, methylene blue, and the peroxides of sodium, potassium and calcium and customary nutrient salts with the exception of assimilable nitrogen containing material.

13. A process for the production of yeast of high ergosterol content which comprises propagating the yeast in a seeded mash by the usual aeration methods subject to the following variations: (a) a propagating temperature of about 92° F., (b) addition of a non-toxic oxidizing agent belonging to the group consisting of persulfates, percarbonates, peracetates, perphosphates, hydroquinone, Indigo carmine, methylene blue, and the peroxides of sodium, potassium and calcium additional to the aerating air, and (c) a propagating medium containing nutrient salts but deficient in assimilable nitrogen.

WILLIAM GORDON BENNETT.